United States Patent [19]
Curtis et al.

[11] Patent Number: 5,540,814
[45] Date of Patent: Jul. 30, 1996

[54] METHOD FOR REMOVING STICKIES FROM WASTEPAPER USING MODIFIED CATIONIC KAOLIN

[75] Inventors: Jerry Curtis, Milledgeville; Henry Agbaje, Macon; Janet Woodward, Forsyth, all of Ga.; Andres Vaska, Basking Ridge, N.J.; Roger Gaudreault, Kingsey Falls, Canada

[73] Assignees: Nord Kaolin Company; Cascades, Inc., Canada

[21] Appl. No.: 377,421

[22] Filed: Jan. 24, 1995

[51] Int. Cl.⁶ .................................................. D21C 5/02
[52] U.S. Cl. .......................... 162/5; 162/8; 162/181.8; 162/199; 162/DIG. 4
[58] Field of Search ............................ 162/164.6, 168.2, 162/181.6, 181.8, 199, DIG. 4, 55, 4, 5, 8

[56] References Cited

U.S. PATENT DOCUMENTS

| 4,190,491 | 4/1926 | Drennen et al. | 162/76 |
|---|---|---|---|
| 4,735,682 | 4/1988 | Didwania et al. | 162/8 |
| 4,964,955 | 10/1990 | Lamar et al. | 162/164 |
| 5,006,574 | 4/1991 | Sennett et al. | 523/351 |
| 5,080,759 | 1/1992 | Buzby et al. | 162/158 |
| 5,131,982 | 7/1992 | St. John | 162/168 |
| 5,151,155 | 9/1992 | Cody et al. | 162/5 |
| 5,221,436 | 6/1993 | Rogan et al. | 162/199 |
| 5,234,543 | 10/1993 | Markham et al. | 162/5 |
| 5,246,548 | 9/1993 | Aston et al. | 162/199 |
| 5,266,166 | 11/1993 | Dreisbach et al. | 162/199 |
| 5,453,159 | 9/1995 | Markham | 162/4 |

OTHER PUBLICATIONS

"Chemical Treatment Reduces Stickies Buildup on Machine Fabric", Pulp & Paper, Apr. 1994.
"Stickies Control by Detackification", 1986 Pulping Conference.

*Primary Examiner*—Donald E. Czaja
*Assistant Examiner*—Dean T. Nguyen
*Attorney, Agent, or Firm*—Thompson Hine & Flory P.L.L.

[57] ABSTRACT

Methods for reducing stickies and removing ink from wastepaper fiber wherein a cationic kaolin is added to a wastepaper fiber furnish under conditions such that the kaolin attaches to the stickies or the ink and the stickies or ink are removed from the furnish using a centrifugal cleaner.

11 Claims, No Drawings

METHOD FOR REMOVING STICKIES FROM WASTEPAPER USING MODIFIED CATIONIC KAOLIN

This invention relates to a method for recycling paper products. In particular, this invention relates to the removal and control of stickies and to deinking of pulp and paper in papermaking processes using wastepaper.

BACKGROUND OF THE INVENTION

Recycling of post consumer paper products has become much more important in the last few years. Growing concerns about the environment, alternatives to solid waste disposal, increasing consumer demand for quality recycled papers, and various state and federal laws that mandate levels of recycled fibers all have combined to increase the use of recycled paper in paper making. See *Paper Recycling*, edited by K. L. Patrick, Miller Freeman Inc., San Francisco, 1991.

There are several sources of contaminates in recycled paper. One obvious source of contamination during recycling is the accidental inclusion of foreign material in the paper as it is collected. Another source of contaminants is materials such as binders, adhesives, sealants, glues, etc. These troublesome contaminants can be more generally categorized as "stickies". Their varying sources include polyvinyl acetate and polyvinyl alcohol resins, hot melt adhesives, wet strength residuals, SBR and vinylacrylic rubber lattices, pressure sensitive adhesives, and so forth.

Stickies are so chemically diverse that removal by chemical means alone is very difficult. Stickles interfere with paper production by fouling equipment and reducing the quality of the finished product. Stickies are generally considered to be the product of additions to the paper as contrasted with "pitch" which derives from naturally occurring resinous byproducts in the wood.

Stickies accumulate in white water recycle systems resulting mostly in deposits on paper forming fabrics, on felt and on wet end equipment. Consequently, quality problems such as pinholes, increased down time due to frequent break down and clean ups, additional costs for cleaning and prevention, inherent damages to felt, fabric, and drying equipment are commonly encountered in the production and use Of secondary or recycled fiber furnish. See Moreland, Robert D., "Stickies Control by Detackification." 1986 *Pulping Conference*, Tappi Press, Atlanta, 1986, p. 193. As will be readily understood, these problems cost mills time and money.

Larger sized (>0.42 mm) stickies generally can be easily removed by mechanical screening and sieving processes and are not a significant problem. Medium sized stickies (0.075–0.42 mm) cannot be effectively removed by mechanical means. They may be pliable making them difficult to remove by screening. Small size stickies are not a problem as long as they remain stable in the furnish. However, once they become unstable, they accumulate, agglomerate, and stick onto surfaces of the papermaking equipment. They eventually grow larger and are subsequently released into the pulp resulting in pinholes, breakages in the sheet, and poor paper quality.

The other class of contaminants in recycled paper addressed by the present invention is ink. Since ink by its nature is colored (usually black), the presence or retention of ink in the formed sheet reduces brightness and can cause dark spots. The increasing use of mixed office waste as a source of recycled fiber for printing and writing grades poses a particular problem in recycling waste paper. Mixed office waste contains a high percentage of nonimpact printed material such as xerographic or laser printed paper that is difficult to deink. The toner particles when removed from the fiber surface have been found to be flat and platelike. Also the density of the separated ink material tends to be about equal to that of the medium which makes removal by conventional mechanical means such as screening, cleaning, flotation and washing difficult. The best solution to ink contamination is to remove the ink prior to paper formation.

Current techniques for stickies control as reported in the general literature can be grossly categorized into mechanical methods and chemical methods. Mechanical methods include combinations of coarse and fine screening, hydrodynamic washing and high intensity dispersion. The high intensity dispersion units readily break the stickies into very small particulates that can be absorbed onto the pulp fiber without adversely impacting the quality of the finished sheet. High consistency pulping combined with agglomeration chemistry also contributes to stickies removal through consolidation of the stickies into large enough mass that enhances easy removal by mechanical means.

Use of chemical additives is a much more common approach to stickies control. Traditional additives include talc, organic solvents, alum, sequestering agents, dispersants (cationic, anionic, and nonionic), zirconium compounds, and organotitanium compounds. See Doshi, Mahendra R., "Properties and Control of Stickies", *Recycled Paper Technology*, Tappi Press, Atlanta, 1994, p. 73. All these chemical additives have exhibited some, albeit limited, success in the control of stickies. The mechanisms associated with chemical additives involve dispersion, electrostatic attraction, agglomeration, surface tension modification, adsorption, detackification and so forth. Conventional chemical methods for controlling stickies detackify, disperse and retain the stickies in the finished pulp. However, dispersed stickies may accumulate in white water, become unstable, agglomerate and result in poor paper quality and decreased machine performance. Although the objective of preventing the stickies from adhering to equipment is attained, the stickies end up being incorporated into the finished sheet. Also, retained stickies may contribute to increased dirt and lower the brightness of the pulp.

U.S. Pat. No. 4,964,955 to Lamar and other literature teach pitch control processes using cationic polymeric agents and/or chemically modified bentonites and clays in papermaking processes. See also Hassler, Thord. "Pitch Deposition in Papermaking and the Function of Pitch-Control Agents", *Tappi Journal*, Vol. 71 (6) 1988, p. 195. Lamar, in particular, discloses reducing pitch through the addition of a cationic particulate such as kaolin to the furnish. However, using the Lamar method, the pitch is not removed but ends up being dispersed and retained in the paper.

U.S. Pat. No. 5,151,155 to Cody teaches a deinking process using a cationic smectite clay. Cody teaches removing the ink waste by either flotation or washing. Cody proposes that it would be highly desirable if the process also removed tacky contaminants. As noted in Moore, D. M. and Robert C. Reynolds, Jr., *X-Ray Diffraction and the Identification and Analysis of Clay Minerals*, Oxford University Press, Oxford, N.Y., 1989, pp. 119–121, smectite is a group of clay minerals with a layer charge between 0.2 and 0.6 charge per formula unit which swell in the presence of water. Kaolin, in contrast, has approximately a zero layer charge. There are critical nontrivial differences between the process as taught by Cody and the use of cationic kaolins in accordance with the present invention. In particular, suspensions of modified smectite clays cannot be obtained in concentrations substantially greater than about 7.2% solids which makes them expensive to ship, whereas suspensions of cationic kaolins are generally obtained in concentrations greater than about 40%. In addition, the Cody process requires about 26% or about 535 pounds of smectite clay on a dry basis per ton dry pulp. By contrast, the process of the present invention can require as little as 20 pounds of cationic kaolin per ton of pulp on a dry basis.

U.S. Pat. No. 5,131,982 to St. John teaches the use of cationic polymers in effect as a retention aid in the treatment of coated broke. Undesirable components are caused to attach to the fibers of the coated broke after they have been repulped and are retained in the pulp.

U.S. Pat. No. 4,190,491 further teaches the use of cationic polymer as a pitch retention aid. The pitch control additive functions to disperse the pitch and deposit or retain the dispersed pitch into the pulp in finely divided form.

U.S. Pat. No. 5,221,436 discloses use of cationic polyelectrolytes and a clay mineral for pitch control by incorporation. Oleic acid was used to simulate pitch and the effectiveness in a real papermaking system is questionable. This patent does not mention stickies and is of no relevance to the product of our invention.

SUMMARY OF THE INVENTION

The present invention provides a method for controlling stickies in pulping and papermaking operations using wastepaper in which stickies are removed from the system, thus eliminating their retention in the paper and accumulation in the whitewater. The method of the present invention also appears to be effective in deinking. In accordance with the invention, not only is the number of stickies greatly reduced, but the dirt level decreases. Dirt, according to TAPPI Test Method T437 OM-90, "Dirt in Paper and Paperboard", is any foreign matter embedded in the sheet which when examined by reflected light has a contrasting color to the rest of the surface and has an equivalent black area of 0.04 $mm^2$ or over. Ink is included under the specifications of dirt. This invention simultaneously results in a reduction in the number of stickies and in a reduction in dirt in the finished pulp or paper product. Since a major source of dirt in recycled paper is the ink remaining in the paper, it appears that the method of the present invention removes some residual ink particles. It should be noted that the dispersion and retention of pitch in the paper as taught by Lamar is very undesirable in the case of ink particles. As shown by Doshi in "Recycled Paper Technologies", Tappi Press, 1994, p. 73, even if the ink is dispersed, a removal step must be included to improve brightness.

In accordance with the invention, a cationic kaolin is added to a wastepaper pulp furnish and reacts with the stickies. The kaolin is then removed from the pulp using conventional cleaners. The cationic kaolin attaches to the stickies and the ink particles, thereby modifying the stickies and ink in such a manner that enables easy removal with conventional cleaners. Although the exact mechanism is unknown, it is hypothesized that the attachment of the cationic kaolin to ink and stickies particles results in an increase in the apparent specific gravity of the ink or stickie particle. The resulting stickie or ink particles laden with kaolin particles now has a higher specific gravity than the surrounding liquid medium, thereby facilitating removal by centrifugal cleaners.

DETAILED DESCRIPTION OF THE INVENTION

The wastepaper can be pulped in a conventional manner. FIG. 1 illustrates schematically the operations in a typical plant for producing pulp from wastepaper. The term "wastepaper" as used herein includes newsprint, paperboard, old corrugated containers, mixed office waste, etc. It includes any recyclable wastepaper for which stickies removal and/or deinking would be desirable. One example of a wastepaper pulping process is carried out at a consistency of about 4 to 16%. The pulp from the pulper is diluted, screened, and then dewatered to a consistency of about 8 to 10%. Pulp from the thickener is first sent to a screw press and then to a disperser. Pulp accepts from the disperser are conveyed to the feed chest of the flotation unit where they are diluted with water to a consistency of about 1%. The pulp is fed to the flotation cell where air is added. Ink-containing foam on top of the pulp is then removed either mechanically or drawn off by vacuum. The deinked pulp is cleaned with light cleaners such as tangential flow centrifugal cleaners. Lighter weight rejects are removed separately from the bottom of the conical part of the cleaners while the accepts stock is discharged tangentially. Heavier contaminants can be removed in heavy cleaners such as posiflow centrifugal cleaners. The cleaned pulp is screened to provide the finished product.

In accordance with the invention, the cationic kaolin can be added to the stock at any point in the process prior to the cleaners. It is particularly convenient to add the kaolin to the furnish after it has been screened to remove gross contaminants such as staples, tape, thread and the like, but the kaolin can also be added at the pulper or disperser. The amount of cationic kaolin added to the pulp usually ranges from about 5 to 200 pounds per short ton of dry pulp on a dry basis and preferably from about 10 to 60 pounds per dry short ton. In many cases as little as 20 pounds per dry short ton is effective. However, the amount can be varied depending on the amount of stickies and ink contained in the pulp. The complex (cationic kaolin plus stickies or ink) is removed at the centrifugal cleaning stage.

Control data shows that processing the pulp without cationic kaolin does not reduce the number of stickies and only reduces the total area covered by stickies by 7%. When a cationic kaolin is added at the 1% level (dry on dry pulp), there is a dramatic reduction in the number of stickies and in the total area covered by stickies in the finished product. When samples from each beneficiation step are examined, the data suggests a mechanism of action for the invention. In the flotation cells there is little or no reduction in the number of stickies and only a 20% reduction in the area covered by stickies. However, in the cleaners battery a 41% reduction in the number of stickies and a 33% reduction in the area covered by stickies has been observed. Most of the removal occurs in the cleaners. This data is consistent with attachment and removal based on an increase in apparent density. This data showing the collection points can be seen in Table I.

Dirt particulates are divided into those greater than or equal to 0.08 $mm^2$ and those greater than or equal to 0.04 $mm^2$ (see Table II). When the product of invention is added to recycled pulp (as compared to the pretrial with no addition), the number of larger dirt particles increases but the number of smaller dirt particles decreases by almost 44%. To determine whether the product of invention is retained in the paper, the ash is measured. The pretrial pulp ash is higher than the treated pulp ash. This indicates that the product of invention is not retained in the finished pulp.

TABLE I

| Sampling Point* | Number of Stickies | | Area of Stickies** | |
| --- | --- | --- | --- | --- |
| | Control | Trial | Control | Trial |
| Disperser | 12 | 13 | 1.78 | 1.94 |
| Flotation Cell | — | 13 | — | 1.64 |
| Centrifugal Light Cleaner | — | 13 | — | 1.66 |
| Centrifugal Heavy Cleaner | — | 12 | — | 1.47 |
| Finished Pulp | 13 | 8 | 1.64 | 0.92 |

*Samples from the process stream just prior to the processing stage except the finished pulp.
**mm$^2$/150 dry gram pulp.

TABLE II

| Dirt (ppm) | ≧0.08 (mm$^2$) | ≧0.04 (mm$^2$) |
| --- | --- | --- |
| Control | 2.4 | 12.8 |
| Trial | 3.9 | 7.2 |

In summary, it has been observed that the cationic kaolin reduces the total number of stickies and their total area in the finished product when deployed in recycled office waste. Stickies are not removed in the flotation cells. Reduction in numbers of stickies occurs at the cleaners. The ash content does not increase in the finished pulp.

The stickies were determined in the pulp using the following procedure: The pulp is taken at any point in the process and diluted to 3% consistency and disintegrated for 5 minutes on the British Standard Disintegrator. One hundred and fifty dry grams of pulp (5,000 wet grams at 3% consistency) is slowly added over a five minute period to a Sommerville screen with 150 μm slots. After the pulp is added, the screen is washed for an additional 15 minutes. The material retained on the screen is carefully scraped off using a TEFLON ruler and transferred to 500 ml of deionized water. The resulting stickies suspension is filtered on a Whatman filter paper #111 using a Buchner funnel. The filter paper with retained impurities is oven dried at 105° C. for exactly 10 minutes. After drying the filter paper is dipped in a 1% solution of nonpolar blue dye in heptane for 5 to 10 seconds and then dried again at 105° C. for exactly two minutes. Using a light microscope and a sharp pointed instrument, the stickies on the filter paper are determined using the color and the plastic character (determined by probing each particle) of each particle. The number of stickies (sticky particles at room temperature) and the area are determined using Tappi Test Method T 213 OM-89 dirt chart.

From the standpoint of the convenience of operations, the cationic kaolin can be added to the pulp at the pulper, kneader or disperser or a combination thereof. While it is anticipated that the cationic kaolin may be more effective in stickies removal and deinking under certain conditions as opposed to others, the cationic kaolin appears to be effective at the pulp consistencies, pH and temperatures generally encountered in repulping operations.

Kaolin is a naturally hydrophilic clay mineral consisting essentially of hydrous aluminum silicates in the form of alternating silicon-oxide and aluminum-hydroxyl layers or sheets having an approximate composition of $Al_2O_3.2SiO_2.2H_2O$. In its natural state, kaolin is negatively charged and shows little or no tendency to adsorb stickies.

The kaolin from which the cationic kaolin is prepared can range in particle size from fine, about 0.1 μm, to coarse, about 40 μm.

The addition of the cationic polymer to the kaolin is generally carried out at room temperature (about 25° C.), although addition can be carried out at any suitable temperature which will facilitate adsorption of the polymer onto its surfaces. Moderate stirring, e.g., at from about 100 to about 1000 rpm will also facilitate adsorption. Alternatively, slurries of cationic kaolin useful in the present invention can be prepared by passing an aqueous solution of a cationic polymer and an aqueous dispersion of kaolin through a static mixer. The adsorption reaction proceeds at room temperature. Examples of the preparation of the kaolin are provided below.

The amount of cationic polymer added should be sufficient to provide kaolin having a Muetek value (charge density) (Muetek Analytical Inc., Marietta, Ga.) of at least about +30 μeq/g and preferably a Muetek value of from about +45 to about +250 μeq/g. Typically, the resulting aqueous slurry of cationic kaolin will have a solids content ranging from about 40% to about 70%, and preferably from about 50% to about 60%. While the kaolin can be diluted and used at lower solids, shipping costs render the diluted product economically undesirable.

The particular cationic polymer employed, its molecular weight and charge density, and the average particle size of the kaolin all play a part in determining the amount of polymer used to provide a kaolin having a sufficient number of positively charged polymer molecules attached to the substrate particles to give a mass having a Muetek value within the above-stated range. Any water soluble cationic polymer which can be adsorbed on the kaolin and provides the aforementioned Muetek value should be useful in the present invention. Preferably, the polymers have a charge density of at least about 4,000 to about 8,000 μeq/g and a molecular weight of 10,000 to 500,000 daltons. Representative examples of some commercially available polymers that have been used include Nalco 94 DC 047 and Nalco 8117 cationic epichlorohydrin dimethylamide polymers available from Nalco Chemical Company, Prochem 3100, a cationic epichlorohydrin polymer available from Southern Water Consultants, and Sharpe 1144, a poly(diallyldialkylammonium halide) cationic polymer from Sharpe Chemical Co., and a polyalkylester of a tertiary amine halide such as Stabiron C826, Synechron, Inc., Morgantown, N.C. However, it is anticipated that the cationic polymers described in Lamar, U.S. Pat. No. 4,964,955 at column 9, line 50 to column 10, line 35 should also be useful herein. In particular, the poly(diallyldimethylammonium halides) are useful.

The invention will be described in more detail by reference to the following non-limiting examples.

EXAMPLE 1

One hundred forty grams of water and 10 grams of Nalco 94 DC 047 (Nalco Chemical Company) were mixed and 329 grams of 60.8% solids Norcote II Kaolin (Nord Kaolin Company) was slowly added with stirring at 400 RPM. To this starting mixture, 329 grams of 60.8% solids Norcote II Kaolin and 10 grams of Nalco 94 DC 047 were simultaneously added with stirring. The final suspension contained 50.1% solids. The dosage was 100 pounds Nalco 94 DC 047 per dry ton of Norcote II.

EXAMPLE 2

The process described in Example 1 was repeated except Prochem 3100 (Southern Water Consultants) was substituted for the Nalco 94 DC 047 on an equal weight basis.

EXAMPLE 3

The process described in Example 1 was repeated except Sharpe 1144 (Sharpe Chemical Co.) was substituted for the Nalco 94 DC 047 on an equal weight basis.

EXAMPLE 4

A five gallon sample of pulp containing "stickies" originating as rejects from a screen were received from a commercial paper recycling mill. The pulp consistency was determined at 13%. To identify and isolate stickies, pulp was diluted with water to 1% consistency. Stickies were located, verified and removed with a pipette.

For effects and interactions with the cationic kaolin produced in Example 1, the pulp was diluted to 1% consistency and under vigorous agitation in a blender mixed with untreated kaolin, cationic kaolin, or no additives, for 15 seconds. Qualitative assessment of the "stickies" was conducted visually and an evaluation of the effects of the kaolins was conducted with scanning electron microscopy (SEM). The stickies that floated in the water seemed to be comprised of relatively large amounts of fibers which appeared to be held together by an adhesive material. Floating stickies were found to sink to the bottom when treated with small amounts of the cationic kaolin. No similar sinking was observed with equal amounts of untreated kaolin. This result is an indication of the effect of the cationic kaolin on "stickies" behavior.

Ten pounds per ton and 20 pounds per ton dry on dry of the cationic kaolin of Example 1 or an untreated kaolin were added to a pulp slurry of about 1% consistency. Thereafter, the "stickies" were isolated and evaluated with SEM. Micrographs of the "stickies" elucidate the effectiveness of the invention. Stickies appear to consist of large smooth areas containing cracks and crevices. These cracks/crevices appeared to be most favored point of attachment of the products of the invention. With the untreated kaolin, very few clay particles were visible on the surface of the stickies or even within the crevices. Stickies treated in accordance with the invention, on the other hand, showed a high concentration of particles attached to the surface of the stickies within the crevices. From these results, it appears that the cationic kaolin successfully adhered to the surface of the stickies. Untreated kaolin failed to attach to the surface of the stickies.

EXAMPLE 5

Deinking was evaluated using photocopier toner in water as a model system. Two different particle size kaolins were tested: Norcote II, a relatively fine kaolin at about 80% <2 μm (Median 0.45 μm) and Norfil, a relatively coarse kaolin at about 53%<2 μm (Median 0.8 μm). These kaolins were made cationic by the procedure used in Example 1 using Nalco 94 DC 047. The Norcote II clarified the suspension of toner in water faster than the coarser Norfil. When scanning electron micrographs were made of the various mixtures, the cationic kaolin made with Norcote II was observed to more completely cover the surface of the photocopy toner particles than did the particulate made with 5 Norfil. The respective untreated kaolins Norcote II and Norfil did not attach to the photocopy toner particles.

Based on these results, further work using a standardized printed photocopied paper as a feed stock and pulping chemicals as processing aides was conducted. It was observed that the processing chemical reduced the dirt in the sheet by 17% but the addition of the cationic kaolin made with Norcote II and Nalco 94 DC 047 reduced the dirt by 47%. See Table III.

TABLE III

Deinking Efficiency of Product of Invention

| Conditions | Number of Dirt Particles | % Removed |
| --- | --- | --- |
| Heat Only | 195 | — |
| Heat and chemicals | 162 | 17 |
| Heat, chemical and cationic kaolin | 104 | 47 |

EXAMPLE 6

Using a more complicated system involving xerographic paper to simulate ink and computer labels to simulate stickies, tests were run. Stickies, dirt and brightness were measured. One hundred grams of xerographic sheets with 2 grams of computer labels attached were cut into 1" squares and added to 2500 grams of water at 90° C. The mixture was cooked for 10 minutes with occasional stirring. One thousand two hundred and fifty grams of the mixture was put in a large Waring blender and blended for 10 seconds. One percent by dry weight (based on dry weight of sheets and labels) of the cationic kaolin of Example 1 was added and the mixture blunged for 20 seconds. The contents of the blender were transferred to a 2½ gallon bucket which was then completely filled with warm water. A few drops of a liquid detergent were added and the pulp mixture was subjected to a wash/flotation process. About 30 grams of the strained pulp was made into a handsheet. The brightness and Hunter L,a,b values were determined by averaging 10 readings. A 32 sq. in. sheet was cut out and dirt determined by Tappi Method T 213 OM-89 dirt chart. The same sheet was sprayed with 0.1% crystal violet. After drying, the number of stickies was determined by counting using a light box. The results are shown in Table IV.

TABLE IV

| Polymer | Dose[1] | Dirt[4] Count | G.E. Brightness | Hunter Values | | | Number of Stickies |
| --- | --- | --- | --- | --- | --- | --- | --- |
|  |  |  |  | L | a | b |  |
| Nalco 94DC047 | 146 | 44 | 81.2 | 91.29 | 0.59 | 2.57 | 38 |
| Nalco 8117 | 158 | 47 | 81.0 | 91.45 | 0.63 | 2.89 | 44 |
| Sharpe 1144 | 84 | 34 | 81.7 | 91.55 | 0.55 | 2.52 | 33 |

TABLE IV-continued

| Polymer | Dose[1] | Dirt[4] Count | G.E. Brightness | Hunter Values L | a | b | Number of Stickies |
|---|---|---|---|---|---|---|---|
| Nalco 94DC047 | 105 | 41 | 81.1 | 91.28 | 0.57 | 2.59 | 41 |
| Pigment Control[2] | — | 62 | 80.1 | 90.54 | 0.57 | 2.36 | 49 |
| Control[3] | — | 161 | 77.2 | 88.6 | 0.54 | 1.82 | 66 |

[1]Pounds polymer per ton of kaolin (dry/dry).
[2]Untreated kaolin.
[3]Control with no washing and no kaolin.
[4]Tappi method. T 213 OM-89.

1) Pounds polymer per ton of kaolin (dry/dry).
2) Untreated kaolin.
3) Control with no washing and no kaolin.
4) Tappi method. T 213 0M-89.

As can be seen, the product of invention reduces the dirt and the number of stickies. The brightness and L value are also improved.

EXAMPLE 7

A mill trial was conducted at a post consumer office paper recycling facility. The product of Example 1 was added at 14:30 hours and pulp samples were collected before the disperser and at the end of the run. A schematic diagram is shown in FIG. I.

Table V tabulates the number of stickies before the disperser and in the product for various times after the product of the invention was added. The percent reduction of stickies is calculated by subtracting the number of stickies in the product from the number of stickies in the pulp at the disperser and dividing the difference by the number of stickies at the disperser. The resulting answer is converted to percent by multiplying by 100. The same procedure is used for the area of the stickies and the percent reduction.

As can be seen, even though the feed (before disperser) values varied widely, the product was always lower than the feed for both stickies and total stickies area.

TABLE V

| | Time | | | | |
|---|---|---|---|---|---|
| | 14:30 | 18:00 | 21:00 | 24:00 | 3:00 |
| Stickies No. at Disperser | 21 | 20 | 12 | 12 | 11 |
| Stickies No. in Product | 19 | 13 | 8 | 6 | 6 |
| Stickies Area at Disperser* | 2.71 | 2.68 | 1.90 | 1.58 | 1.45 |
| Stickies Area in Product* | 1.69 | 1.65 | 1.03 | 0.59 | 0.79 |
| Stickies Reduction (%)** | 10 | 35 | 33 | 54 | 46 |
| Area Reduction (%)** | 38 | 38 | 45 | 63 | 46 |

*mm²/150 grams dry pulp.
**The percent reduction was calculated by taking one minus the ratio of the finished product value to the disperser value times 100.

TABLE VI

Effective Sampling Point and Time on Stickies Number

| Sampling Point* | TIME → | | | | | | | |
|---|---|---|---|---|---|---|---|---|
| | 14:00 | 18:00 | 21:00 | 0:0 | 3:00 | 9:00 | 18:00 | 21:00 |
| Disperser | 21 | — | 12 | — | — | — | — | — |
| Flotation | 21 | 20 | 12 | 12 | 11 | 16 | 16 | 10 |

TABLE VI-continued

Effective Sampling Point and Time on Stickies Number

| Sampling Point* | TIME → | | | | | | | |
|---|---|---|---|---|---|---|---|---|
| | 14:00 | 18:00 | 21:00 | 0:0 | 3:00 | 9:00 | 18:00 | 21:00 |
| Cell Finished Pulp | 19 | 13 | 8 | 6 | 6 | 10 | 8 | 6 |

*Samples taken from process stream just prior to processing stage except the finished pulp.

Flotation cell and cleaner rejects were analyzed by SEM and energy dispersive spectroscopic analysis (EDS). EDS mapping indicated that the kaolin was attached to the stickies of the cleaner rejects. Although a specimen of another large, flake-like aluminosilicate was found in the flotation cell rejects, this aluminosilicate resembled coating material and was found to contain titanium dioxide and thus could not originate from the cationic kaolin. Stickies were not found in the flotation cell rejects.

Having described the invention in detail and by reference to specific embodiments thereof, it will be apparent that numerous modifications are possible without departing from the spirit of the invention as defined by the following claims.

What is claimed is:

1. A method for reducing stickies in wastepaper fiber which comprises:

adding a cationic kaolin to a stickies containing furnish of wastepaper fiber such that said cationic kaolin attaches to said stickies, and removing said stickies carrying said kaolin from the furnish using a centrifugal cleaner, wherein said cationic kaolin is added to said furnish in an amount of about 5 to 200 pounds per short ton fiber on a dry basis and said cationic kaolin is a kaolin having a cationic polymer on the surface thereof which is sufficiently electropositive that said cationic kaolin exhibits a charge density of at least +30 µeq/g.

2. A method as recited in claim 1 in which said cationic kaolin is prepared from an anionic kaolin having a particle size ranging from about 0.1 µm to about 40 µm.

3. A method of claim 2 wherein said cationic kaolin is a kaolin having a water soluble cationic polymer on the surface thereof.

4. A method as recited in claim 3 in which said cationic kaolin is added to said furnish in an amount ranging from about 10 to about 60 dry pounds per short ton of dry fiber in said furnish.

5. A method as recited in claim 4 in which said cationic polymer is sufficiently electropositive so that said kaolin exhibits a charge density of about +45 to 250 µeq/g.

6. A method as recited in claim 5 in which said water soluble cationic polymer is an epichlorohydrin dimethylamide polymer with a molecular weight from about 10,000 daltons to about 500,000 daltons.

7. A method as recited in claim 5 in which said cationic polymer is a poly(dialkyldiallylammonium halide).

8. A method as recited in claim 7 in which said cationic polymer is a poly(diallyldimethylammonium chloride) with a molecular weight from about 10,000 daltons to about 500,000 daltons.

9. A method as recited in claim 5 in which said cationic polymer is a polyalkylester of a tertiary amine halide.

10. A method as recited in claim 9 in which said water soluble cationic polymer is a polyalkylester of a tertiary amine chloride polymer.

11. A method for removing ink from wastepaper fiber which comprises:

adding a cationic kaolin to an ink containing furnish of wastepaper fiber such that said cationic kaolin attaches to said ink, said cationic kaolin being added to said furnish in an amount of about 5 to 200 pounds per short ton fiber on a dry basis and said cationic kaolin being a kaolin having a cationic polymer on the surface thereof which is sufficiently electropositive that said cationic kaolin exhibits a charge density of at least about +30 μeq/g, and removing said ink carrying said cationic kaolin from said furnish using a centrifugal cleaner.

\* \* \* \* \*